United States Patent
Ciccone et al.

(10) Patent No.: US 12,285,894 B2
(45) Date of Patent: Apr. 29, 2025

(54) INJECTION MOLDING APPARATUS

(71) Applicant: Top Grade Molds Ltd., Mississauga (CA)

(72) Inventors: Vincenzo Ciccone, Kleinburg (CA); Hon Kee Wu, Oakville (CA)

(73) Assignee: Top Grade Molds Ltd., Mississauga (CA)

( * ) Notice: Subject to any disclaimer, the term of this patent is extended or adjusted under 35 U.S.C. 154(b) by 948 days.

(21) Appl. No.: 17/244,613

(22) Filed: Apr. 29, 2021

(65) Prior Publication Data
US 2022/0118664 A1 Apr. 21, 2022

Related U.S. Application Data

(60) Provisional application No. 63/094,090, filed on Oct. 20, 2020.

(51) Int. Cl.
*B29C 45/20* (2006.01)
*B29C 45/27* (2006.01)

(52) U.S. Cl.
CPC .......... *B29C 45/2725* (2013.01); *B29C 45/20* (2013.01); *B29C 2045/2733* (2013.01)

(58) Field of Classification Search
CPC ........ B29C 45/1777; B29C 2045/2733; B29C 2045/2759; B29C 2045/2761; B29C 2045/2762
See application file for complete search history.

(56) References Cited

U.S. PATENT DOCUMENTS

| | | | |
|---|---|---|---|
| 4,653,995 A | 3/1987 | Ward | |
| 5,096,410 A * | 3/1992 | Loulourgas | B29C 45/2737 425/569 |
| 5,334,006 A * | 8/1994 | Hepler | B29C 45/27 425/572 |
| 6,561,790 B2 | 5/2003 | Blais | |

(Continued)

FOREIGN PATENT DOCUMENTS

| | | |
|---|---|---|
| CN | 206796427 U | 12/2017 |
| CN | 209289689 U | 8/2019 |

(Continued)

*Primary Examiner* — Alison L Hindenlang
*Assistant Examiner* — Debjani Roy
(74) *Attorney, Agent, or Firm* — Smart & Biggar LP

(57) ABSTRACT

An injection molding apparatus for receiving molten material from an injection nozzle and delivering the molten material to a mold cavity is disclosed. The injection molding apparatus includes a molten material conduit device for receiving the molten material and directing the molten material to a molten material receiver defined by a manifold, the manifold directing the molten material the mold cavity housed within the mold assembly of the apparatus. The molten material conduit device includes a manifold-sealed interface effector for sealing against the manifold, and a back plate engager for engaging the back plate that secures the molten material conduit device to the manifold. The manifold, the molten material conduit device and the back plate are cooperatively configured such that a discharge end of the conduit device is sandwiched between the manifold and the back plate and such that the discharge opening is disposed in alignment with the molten material-receiver.

14 Claims, 9 Drawing Sheets

(56) References Cited

U.S. PATENT DOCUMENTS

| | | | |
|---|---|---|---|
| 2004/0166194 A1* | 8/2004 | Trudeau | B29C 45/2737 |
| | | | 425/549 |
| 2008/0131547 A1 | 6/2008 | Mohammed et al. | |
| 2016/0214296 A1* | 7/2016 | Kim | B29C 45/27 |
| 2019/0366608 A1* | 12/2019 | Alves | B29C 45/1781 |
| 2023/0023482 A1* | 1/2023 | Ciccone | B29C 45/22 |

FOREIGN PATENT DOCUMENTS

| | | |
|---|---|---|
| EP | 2714364 B1 | 12/2016 |
| JP | 9262880 | 10/1997 |

\* cited by examiner

INJECTION MOLDING APPARATUS

CROSS-REFERENCE TO RELATED APPLICATION

This application claims the benefit of and priority to U.S. Provisional Patent Application No. 63/094,090 filed Oct. 20, 2020 under the title INJECTION MOLDING APPARATUS, the content of which is hereby expressly incorporated by reference into the detailed description hereof.

FIELD

The present disclosure relates generally to an injection molding apparatus for use in an injection molding machine. In particular, the present disclosure relates to an injection molding apparatus for receiving molten material from an injection nozzle of an injection molding machine and for delivering the molten material to a mold cavity of the injection molding apparatus.

BACKGROUND

Injection molding machines typically include a conduit device, such as a sprue bar, mounted within a corresponding opening formed within a portion of the mold assembly for delivering molten material to the corresponding mold cavity or mold cavities of the injection molding machine. The sprue bar often extends through corresponding openings formed in the one or more mold plates that make up the mold assembly. In some instances, the sprue bar is arranged within the mold assembly such that one end of the sprue bar communicates with a manifold structure, which in some instances includes a manifold insert disposed within a manifold plate, for delivering molten material to the one or more mold cavities housed within the mold. The other end of the sprue bar, which is arranged or exposed on the exterior of the mold assembly, communicates with the injection molding machine nozzle for receiving the molten material from the injection molding machine nozzle.

A common challenge of injection molds is the difficulty to achieve and maintain alignment of the sprue bar, or other conduit device, with the manifold or manifold insert of the combined manifold insert and manifold plate. Alignment of the sprue bar with the injection nozzle can also present challenges. Misalignment of the sprue bar, or conduit device, results in misalignment of the opening of the sprue bar that communicates with the opening on the manifold that receives the molten material. This misalignment often results in leakage of the molten material within other parts of the mold assembly as well as improper and/or incomplete injection of molten material into the mold. Leakage of molten material outside of the mold cavity and within the mold assembly can result in damage to the overall mold assembly that requires a shutdown of the molding operation to clean, repair and/or replace the mold assembly or components within the mold assembly, and may also result in improperly formed molded products.

Accordingly, injection mold assemblies that offer improved sprue bar or conduit alignment and effective sealing of the sprue bar within the mold assembly in an effort to reduce, or mitigate, the effects of leakage of molten material within the mold assembly are desirable.

SUMMARY

In accordance with an aspect of the present disclosure there is provided an injection molding apparatus for receiving molten material from an injection machine nozzle of an injection molding machine, and delivering the molten material to at least one mold cavity housed within a cavity side of a mold assembly, the injection molding apparatus comprising a manifold, wherein the manifold comprises a manifold plate, and a manifold insert disposed within the manifold plate, the manifold insert including a molten material receiver configured for receiving molten material, and at least one passageway for transmitting the molten material received at the molten material receiver to the at least one mold cavity; a molten material conduit device having an inlet opening for receiving the molten material from the injection machine nozzle, a discharge opening for transmitting the molten material to the molten material receiver, and a molten material conduit extending therebetween; and a back plate disposed on the manifold plate and configured for cooperating with the injection machine nozzle; wherein: the molten material conduit device includes a base flange extending outwardly from the discharge opening, the base flange having a first side defining a manifold insert sealed interface effector and a second side defining a back plate sealed interface effector; and the manifold plate, the manifold insert, the molten material conduit device and the back plate are cooperatively configured such that: at least a portion of the base flange is disposed between the manifold insert and the back plate; a first sealed interface is established between the manifold insert sealed interface effector and the manifold; a second sealed interface is established between the back plate-sealed interface effector and the back plate; and the discharge opening is disposed in alignment with the molten material-receiver such that communication between the inlet opening of the molten material conduit device and the molten material receiver is established.

An injection molding apparatus for receiving molten material from an injection machine nozzle of an injection molding machine, and delivering the molten material to at least one mold cavity housed within a cavity side of a mold assembly, comprising: a manifold insert defining a molten material receiver and at least one passageway; a manifold plate configured for receiving the manifold insert; a molten material conduit device having an inlet opening for receiving the molten material from the injection machine nozzle, a discharge opening for transmitting the molten material to the molten material receiver, and a molten material conduit extending therebetween; and a back plate having a molten material conduit device engaging flange defining a molten material conduit device receiving opening, the back plate configured for disposition on the manifold plate and for cooperating with the injection machine nozzle; wherein: the molten material conduit device includes a base flange extending outwardly from the discharge opening, the base flange defining: a manifold insert sealed interface effector; and an aligner; and the manifold insert, the manifold plate, the molten material conduit device and the back plate are cooperatively configured such that: the manifold insert sealed interface effector is disposed in abutting contact with the manifold insert such that the discharge opening is disposed in communication with the molten material receiver; the back plate is disposed on the manifold plate such that the molten material conduit device extends through the molten material conduit device-receiving opening such that at least a portion of the base flange is disposed between the manifold insert and the back plate; and an edge surface of the aligner is disposed in abutting contact the molten material conduit device engaging flange with effect that the discharge opening is disposed in axial alignment with the molten material receiver.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
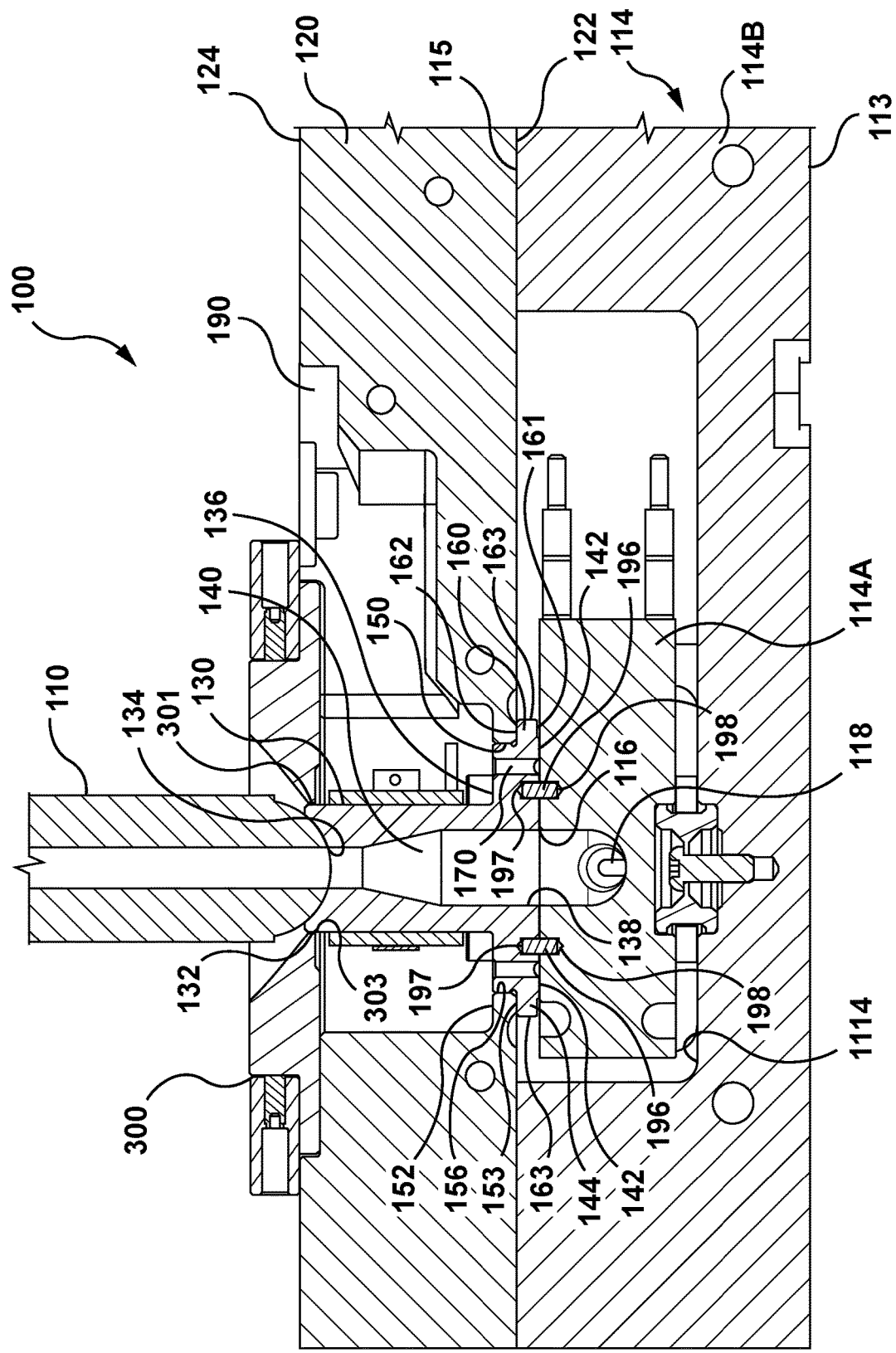
FIG. 1 is a cross-sectional view through an injection molding apparatus according to an example embodiment of the present disclosure with an injection nozzle disposed for delivering molten material to the apparatus.

With reference to FIGS. 1-9, there is shown an injection molding apparatus 100 according to an example embodiment of the present disclosure. The injection molding apparatus 100 is configured for delivering molten material from an injection machine nozzle 110 of an injection molding machine to a mold cavity 112 that is formed within the cavity side 103 of a mold assembly 102 of the injection molding apparatus 100. In some embodiments, the cavity side 103 of the mold assembly 102 includes a plurality of mold cavities 112, the injection machine nozzle 110 delivering molten material to the plurality of mold cavities 112 housed within the cavity side 103 of the mold assembly 102 via a network of passageways formed within the injection molding apparatus 100.

Referring now to FIG. 1, the injection molding apparatus 100 includes a manifold 114, for cooperating with the cavity side 103 of the mold assembly 102. In general, the manifold 114 is configured for delivering molten material to the one or more mold cavities 112 housed within the cavity side 103 of the mold assembly 102. In the example embodiment illustrated in FIGS. 1 and 1A, the manifold 114 is made up of a manifold insert 114A disposed within a corresponding manifold plate 114B. In such example embodiment, the manifold insert 114A is configured for delivering molten material to the one or more mold cavities 112 housed within the cavity side 103 of the mold assembly, while the manifold plate 114b is configured for supporting the manifold insert 114A and stationing the manifold insert 114A in position relative to the mold assembly. Accordingly, in such embodiments, the manifold insert 114A together with the manifold plate 114B make-up the manifold 114 with the manifold insert 114A defining the network of passageways formed within the injection molding apparatus 100 for delivering the molten material, received from the injection machine nozzle 110, to the one or more mold cavities 112. It will be understood, however, that in some example embodiments, the manifold 114 may have different configurations and that the manifold 114 is not necessarily limited to a configuration including a manifold insert disposed within a corresponding manifold plate.

Figure 7:
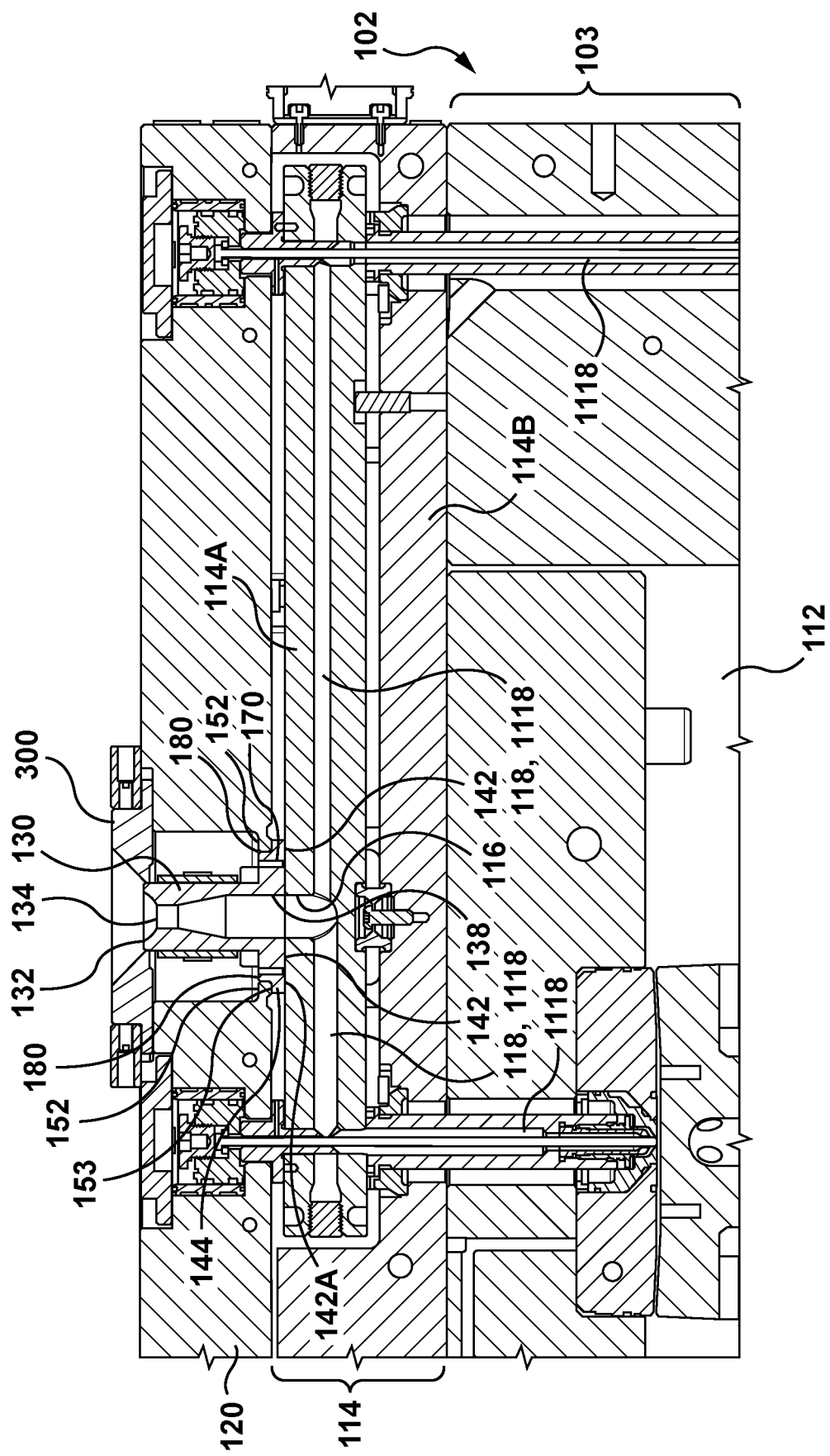
FIG. 7 is a cross sectional view through the injection molding apparatus illustrating the communication between the molten material conduit device and a mold cavity via the manifold.
Figure 8:
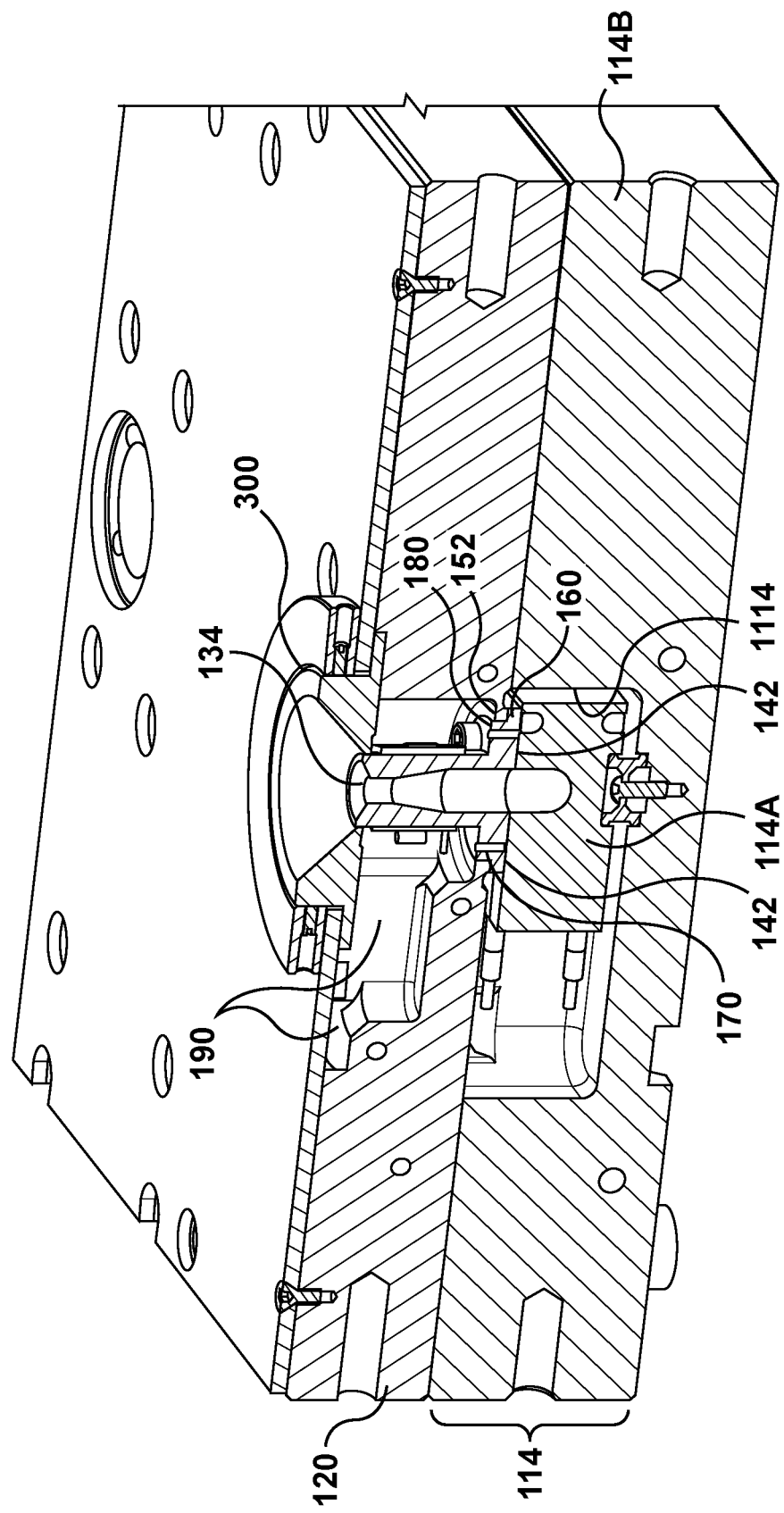
FIG. 8 is a perspective, cross-sectional view of the injection molding apparatus illustrating the mounting of the molten material conduit device relative to the manifold.

With reference, in particular, to the example embodiment illustrated in FIGS. 1, 7 and 8, the manifold plate 114B is configured to receive the manifold insert 114A. Accordingly, in some embodiments, for example, the manifold plate 114B includes a receiving cavity 1114 configured for receiving the manifold insert 114A. The manifold insert 114A includes at least one passageway 118 for distributing the molten material received from the injection machine nozzle 110 to the one or more mold cavities 112. The manifold insert 114A is installed within the receiving cavity 1114 of the manifold plate 114B. Accordingly, molten material delivered to the manifold insert 114A is transmitted through the manifold insert 114A, to the cavity side 103 of the mold assembly 102. In this respect, the manifold insert 114A communicates with an inlet on the cavity side 103 of the mold assembly 102, when the injection molding apparatus 100 is in a closed condition, for transmitting the molten material to the cavity side 103 of the mold assembly. Therefore, the manifold insert 114A is installed within the manifold plate 114B, such that while the injection molding apparatus 100 is in a closed condition and molten material is supplied to the apparatus 100 by the injection machine nozzle 110, molten material received at the manifold insert 114A travels through the manifold insert 114A, housed within and supported by the manifold plate 114B, to the one or more mold cavities 112. Accordingly, it will be understood that the manifold 114 serves to receive molten material from the injection machine nozzle 110 and distribute the molten material to the one or more mold cavities 112 housed within the cavity side 103 of the mold assembly 102 of the injection molding apparatus 100 through a manifold insert 114A disposed within and supported by a manifold plate 114b, or any other suitable configuration.

Figure 1A:
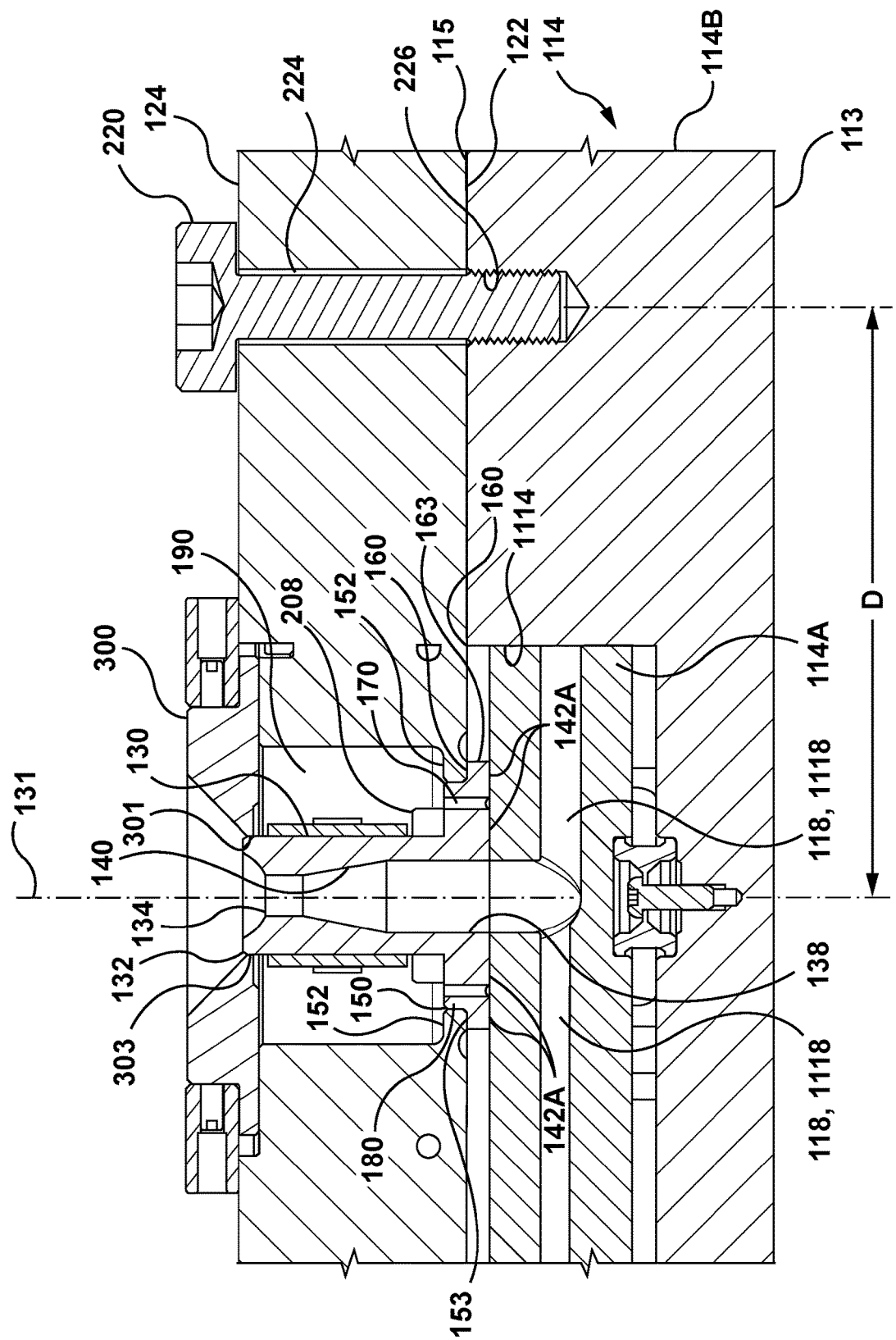
FIG. 1A is another cross-sectional view of the injection molding apparatus, taken 90 degrees relative to the cross-sectional view of FIG. 1, with the injection nozzle removed and illustrating a manifold passageway.

With reference now to the example embodiment illustrated in FIGS. 1 and 1A wherein the manifold 114 includes a manifold insert 114A installed within a manifold plate 114B, the manifold plate 114B has a first side 113 that is configured for mating contact with the cavity side 103 of the mold assembly 102, the first side 113 of the manifold plate 114, therefore, defining a molten material delivery side of the manifold 114 wherein the molten material delivery side of the manifold communicates the molten material, that is received from the injection machine nozzle 110, to the one or more mold cavities 112 housed within the cavity side 103 of the mold assembly 102. The second side 115 of the manifold plate 114B, which is disposed opposite to the first side 113, serves as the molten material-receiving side of the manifold 114 and is configured for mating contact with and being secured to a back plate 120 that encloses or seals the molten material-receiving side of the manifold 114. In the subject example embodiment wherein the manifold 114 includes a manifold insert 114A installed within a manifold plate 114B, the manifold insert 114A includes a molten material receiver, or inlet, 116 that is configured for receiving a supply of molten material that is delivered to the injection molding apparatus 100 via the injection machine nozzle 110. The molten material receiver 116 communicates with the at least one passageway 118 that extends through the manifold insert 114A, from the molten material receiver 116, which communicates with a corresponding inlet on the cavity side 103 of the mold assembly 102 for establishing communication between the manifold insert 114A and the cavity side 103 of the mold assembly 102.

In some embodiments, for example, the at least one passageway 118 defined in the manifold insert 114A is part of a network of passageways 1118 that are interconnected for distributing the molten material received at the molten material receiver 116 through the manifold insert 114A to the one or more mold cavities 112 housed within the cavity side 103 of the mold assembly 102. With reference, again, to the example embodiment illustrated in FIGS. 1 and 1A, the back plate 120 is configured for mounting on and being secured to the second, molten material-receiving side 115 of the manifold plate 114b. Accordingly, the back plate 120 has a manifold engaging side 122 that is configured for mating contact with the second side 115 of the manifold plate 114b such that a sealed interface is effected therebetween. The back plate 120 also has a machine nozzle engaging side 124 that is disposed opposite to the manifold engaging side 122, wherein the machine nozzle engaging side 124 is configured for engaging the injection machine nozzle 110 of the injection molding apparatus 100 so that the injection machine nozzle 110 can deliver molten material to the injection molding apparatus 100. With reference now to FIGS. 1, 1A and FIGS. 2-5, in order to effect transmission of the molten material from the injection machine nozzle 110 to the manifold insert 114A, the injection molding apparatus 100 includes a molten material conduit device 130. The molten material conduit device 130 is configured for engaging with the injection machine nozzle 110 for receiving the molten material from the injection machine nozzle 110, and for delivering the supply of molten material received from the injection machine nozzle 110 to the at least one passageway 118 (or network of passageways 1118) in the manifold insert 114A, via communication with the molten material receiver 116. The molten material conduit device 130 has an inlet end 132 that defines an inlet opening 134, for engaging with the injection machine nozzle 110, and discharge end 136 defining a discharge opening 138 for delivering the supply of molten material received at the inlet opening 134 to the molten material receiver 116. A molten material conduit 140 extends between and interconnects the inlet opening 134 and the discharge opening 138. Accordingly, the molten material conduit device 130 is configured for disposition on the manifold insert 114A such that the discharge end 136 is disposed in abutting contact with the manifold insert 114A with effect that the that the discharge opening 138 of the molten material conduit device 130 is aligned with and disposed in communication with the molten material receiver 116. When the back plate 120 is mounted on the manifold plate 114b of the manifold 114, the molten material conduit device 130 extends through the back plate 120 such that the inlet end 132 and inlet opening 134 remain exposed and accessible from the machine nozzle engaging side 124 of the back plate 120 for engagement with the injection machine nozzle 110. Accordingly, the molten material conduit device 130 may vary in length depending on the particular application and/or overall design of the back plate 120 and/or the injection molding apparatus 100. In some embodiments, for example, the molten material conduit device 130 is a sprue bar.

In order to secure the inlet end 132 of the molten material conduit device 130 in position relative to the back plate 120, in some embodiments, for example, the injection molding apparatus 100 includes a locating ring 300 for supporting the inlet end 132 of the molten material conduit device 130 in position relative to the machine nozzle engaging side 124 of the back plate 120. In some embodiments, for example, the locating ring 300 also serves to locate the inlet end 132 and the inlet opening 134 relative to the machine nozzle-engaging side 124 of the back plate 120 to facilitate proper alignment of the injection machine nozzle 110 with the inlet opening 134 of the molten material conduit device 130. In some embodiments, for example, the locating ring 300 includes a central opening 301 for receiving the inlet end 132 of the molten material conduit device 130. In some embodiments, for example, the inlet end 132 of the molten material conduit device 130 is received within the central opening 301 of the locating ring 300 such that a sealed interface 303 is effected between the locating ring 300 and the inlet end 132 of the molten material conduit device 130 such that the molten material discharged from the injection machine nozzle 110 is directed solely through the inlet opening 134 and molten material conduit 140 of the molten material conduit device 130. Accordingly, in some embodiments, the sealed interface 303 between the inlet end 132 of the molten material conduit device 130 and the corresponding edge surface defined by the central opening 301 in the locating ring 300 serves to prevent molten material from seeping between the molten material conduit device 130 and the back plate 120 into the manifold 114 or manifold insert 114A. In some embodiments, for example, the locating ring 300 has a sloping or concave surface 302 that extends around the central opening 301 for providing sufficient clearance to allow for proper engagement of the injection machine nozzle 110 against the inlet end 132 and inlet opening 134 of the molten material conduit device 130.

In use, when the injection molding apparatus 100 is disposed in a closed condition wherein the molten material delivery side 113 of the manifold plate 114b is disposed in abutting contact with the cavity side 103 of the mold assembly 102, the injection machine nozzle 110 is moved into engagement with the inlet end 132 of the molten material conduit device 130 for delivering a supply of molten material to the injection molding apparatus 100 via the inlet opening 134. Once the molten material is delivered to the one or more mold cavities 112 housed within the cavity side 103 of the mold assembly 102, the injection machine nozzle 110 is moved out of engagement with the inlet end 132 of the molten material conduit device 130 and the molten material is allowed to cure within the mold cavities to form the molded article(s). Once the molten material has cured, the injection molding apparatus 100 is opened and the molded article(s) ejected or otherwise removed from the mold assembly 102 and the injection molding cycle can continue.

In some prior art configurations, continued operation of an injection molding apparatus can result in misalignment of the sprue bar (or other molten material conduit device) relative to the manifold (or manifold insert). Misalignment of the sprue bar (or other molten material conduit device) relative to the manifold (or manifold insert) may occur due to the repeated cycling of the injection machine nozzle being brought into contact with the inlet end of the sprue bar (or other molten material conduit device), which in some instances, may result in dislodging or displacement of the sprue bar (or other molten material conduit device) relative to the manifold or manifold insert. In some prior art configurations, the mounting of the sprue bar relative to the manifold is such that the sprue bar is prone to rotation about an axis that extends normal to the injection axis in response to the forces applied to the sprue bar by the repeated engagement of the injection machine nozzle with the injection molding apparatus against the inlet end of the sprue bar. Any displacement, or rotation, of the sprue bar relative to the manifold (or manifold insert) can result in the sprue bar separating from the manifold or manifold insert and/or misalignment of the sprue bar relative to the inlet to the manifold (or manifold insert) which may lead to unwanted leakage of molten material within with manifold or mold assembly thereby damaging the mold.

In the subject example embodiment, the molten material conduit device 130 is configured for secure mounting relative to the manifold insert 114A within the injection molding apparatus 100 in an effort to maintain proper alignment of the molten material conduit device 130 relative to the manifold insert 114A over repeated operating cycles of the injection molding apparatus 100 to reduce the likelihood of leakage of molten material within the injection molding apparatus 100 and mitigate the potential damage cause by any leakage that may occur. With reference, in particular to the example embodiment illustrated in FIGS. 1 and 1A, the molten material conduit device 130 is disposed relative to the manifold 114 such that the discharge end 136 of the molten material conduit device 130 is disposed in abutting contact with the manifold insert 114A. Disposition of the discharge end 136 of the molten material conduit device 130 in abutting contact with the manifold insert 114A is with effect that the discharge opening 138 of the molten material conduit device 130 is aligned with and disposed in communication with the molten material receiver 116 formed in the manifold insert 114A. The discharge end 136 of the molten material conduit device 130 is also configured for effecting a sealed interface between the molten material conduit device 130 and the manifold 114, or manifold insert 114A. Accordingly, in some embodiments, for example, the molten material conduit device 130 includes a base flange 160 that extends around and away from the discharge opening 136, the base flange 160 having a first side 161 configured for disposition in face-to-face, abutting contact with the manifold insert 114A for effecting a sealed interface with the manifold insert 114A. The molten material conduit device 130, therefore, includes a manifold insert sealed interface effector 142, that is defined by the first side 161 or bottom surface of the base flange 160 of the discharge end 136, wherein the manifold insert sealed interface effector 142 is for effecting a first sealed interface 142A with the manifold insert.

In some embodiments, for example, the base flange 160 extends radially outwardly from the discharge opening 138 defined by the molten material conduit device 130 such that the manifold insert sealed interface effector 142 defines an annular area wherein the annular area has an inner radius, R1, as measured from the central axis of the discharge opening 138 to the circumference of the discharge opening 138 (which corresponds to the radius of the discharge opening 138), and an outer radius, R2, as measured from the central axis of the discharge opening 138, along the first side or bottom surface 161 of the base flange 160 to an outer edge 163 of the base flange 160 defined by the discharge end 136 of the molten material conduit device 130. In some embodiments, for example, the inner radius, R1, is between a minimum of 6.35 mm to a maximum of 25.4 mm. In some embodiments, for example, the outer radius, R2, is between a minimum of 38.1 mm to maximum of 57.15 mm.

In some embodiments, for example, in order to assist with positioning of the molten material conduit device 130 relative to the manifold insert 114A, and with alignment of the discharge opening 138 relative to the molten material receiver 116, molten material conduit device engagers 196 are employed for engaging the discharge end 136 of the molten material conduit device 130 and locating the molten material conduit device 130 relative to the manifold insert 114A while the molten material conduit device 130 is mounted on the manifold insert 114A. In some embodiments, for example, the molten material conduit device engagers 196 have a first end 197 configured for engaging the manifold insert 114A and a second, opposite end 198 configured for engaging the bottom surface or first side 161 of the base flange 160. Accordingly, in some embodiments, for example, the manifold insert 114A includes one or more engager-receivers, or openings, 200 configured for receiving the corresponding first end 197 of the molten material conduit device engagers 196. Similarly, the base flange 160 of the discharge end 136 includes one or more engager-receivers (or openings) 202 configured for receiving the corresponding second end 198 of a respective one of the molten material conduit device engagers 196. The mating engagement between the molten material conduit device engagers 196 with both the manifold insert 114A and the discharge end, or base flange 160, of the molten material conduit device 130 serves to locate the molten material conduit device 130 relative to the manifold insert 114A and hold the molten material conduit device 130 in position relative to the manifold insert 114A during assembly of the injection molding apparatus 100. In some embodiments, for example, the molten material conduit device-engagers 196 are dowel pins.

As described above, once the molten material conduit device 130 is positioned on the manifold insert 114A, the back plate 120 is disposed on the manifold plate 114b, with at least a portion of the molten material conduit device 130 extending therethrough, for enclosing and sealing against the second, molten material-receiving side 115 of the manifold plate 114b. Referring again to FIGS. 1, 1A and 2, in order to further secure the molten material conduit device 130 in position within the injection molding apparatus 100, the discharge end 136 of the molten material conduit device 130 is configured for engaging with the back plate 120 such that at least a portion of the base flange 160 is disposed intermediate, or is pinched between, the manifold insert 114A and the back plate 120. Accordingly, in some embodiments, for example, the discharge end 136 of the molten material conduit device 130 includes a back-plate engager 144 that is configured for engagement between the manifold insert 114A and the back plate 120 such that a second sealed interface 153 is effected between at least a portion of the second side 162 of the base flange 160 and the manifold engaging side 122 of the back plate 120. In the subject example embodiment, the back plate-engager 144 includes at least a portion of the base flange 160.

In order to effect engagement between the discharge end 136 of the molten material conduit device 130 and the back plate 120 such that the back-plate engager 144 is disposed or pinched between the manifold insert 114A and the back plate 120, the back plate 120 includes a molten material conduit device engaging flange 152 that defines a molten material conduit device-receiving opening 150. The molten material conduit device engaging flange 152 is configured such that as the back plate 120 is mounted on the manifold 114 and disposed in abutting contact with the manifold plate 114b, the molten material conduit device 130 extends through the molten material conduit device-receiving opening 150. The molten material conduit device 130 and the molten material conduit device-engaging flange 152 are cooperatively configured such that, while the molten material conduit device 130 is mounted on the manifold insert 114A in communication with the molten material receiver 116 and the back plate 120 is mounted on the manifold plate 114b, the molten material conduit device-engaging flange 152 engages with and is disposed in abutting contact with the back plate engager 144. Accordingly, disposition of the back plate 120 on the manifold plate 114b such that the molten material conduit device 130 extends through the molten material conduit device-receiving opening 150 is with effect that the molten material conduit device-engaging flange 152 engages with and is disposed in abutting contact with the back plate engager 144 of the molten material conduit device 130 such that a sealed interface 153 is effected between the molten material conduit device-engaging flange 152 defined by the back plate 12 and the portion of the second side 162 of the base flange 160 that defines the corresponding surface of back plate engager 144. Accordingly, in some embodiments, for example, the discharge end 136 of the molten material conduit device 130 defines a back plate sealed interface effector 164.

In some embodiments, for example, disposition of the back plate 120 in abutting contact with the manifold plate 114b, and the discharge end 136 of the molten material conduit device 130, is with effect that pressure is applied to the back plate engager 114 due to the "pinching" of the back plate engager 144 between the molten material conduit device-engaging flange 152 defined by the back plate 120 and the manifold insert 114A. In some embodiments, for example, the pressure applied to the back plate engager 144, by the back plate 120, contributes to the establishment of the first sealed interface 142A between the manifold insert sealed interface effector 142 and the manifold insert 114A. In some embodiments, for example, the pressure applied to the back plate engager 144, by the back plate 120, also contributes to the establishment of the second sealed interface 153 between the back plate sealed interface effector 164 defined by the discharge end 136 of the molten material conduit device 130 and the molten material conduit device-engaging flange 152 of the back plate 120. Establishment of the first sealed interface 142a between the manifold insert sealed interface effector 142 defined by the base flange 160 of the discharge end 136 of the molten material conduit device 130 is with effect that leakage of molten material from the discharge opening 138 between the manifold insert sealed interface effector 142 defined by the base flange 160 of the discharge end 136 of the molten material conduit device 130 and the manifold insert 114A is resisted. Establishment of the second sealed interface 153 between the back plate sealed interface effector 162 defined by the back plate engager 144 of the discharge end 136 of the molten material conduit device 130 and the corresponding surface defined by the molten material conduit device-engaging flange 152 of the back plate 120 is with effect that, should leakage of molten material exterior to the molten material conduit device 130 occur (for instance if leakage of molten material occurs between the inlet end 132 of the molten material conduit device 130 and the locating ring 300), further infiltration of this molten material into the injection molding apparatus 100 between the back plate 120 and the manifold plate 114b is resisted.

In some embodiments, for example, the discharge end 136 of the molten material conduit device 130 includes a relief passage 170 that extends through the discharge end 136 of the molten material conduit device 130 for directing molten material away from the sealed interface 142A established between the discharge end 136 of the molten material conduit device 130 and the manifold insert 114A towards the machine nozzle-engaging side 124 of the back plate 120 (or the back side of the injection molding apparatus 100). The relief passage 170 is configured such that, in the event that leakage of molten material from the discharge opening 138 of the molten material conduit device 130 between the manifold insert sealed interface effector 142 defined by the base flange 160 and the corresponding surface of the manifold insert 114A occurs with effect that the sealed interface 142A established by the abutting contact between the manifold insert sealed interface effector 142 and the manifold insert 114A is defeated, the leaking molten material is directed through the relief passage 170, towards the second, or machine nozzle-engaging side 124 of the back plate 120 (or back side of the injection molding apparatus 100). By directing any leaking molten material towards the second, or machine nozzle-engaging side 124 of the back plate 120 (or back side of the injection molding apparatus 100), the leaking molten material is directed away from the manifold insert 114A and any passageways that are contained within the manifold insert 114A that are not intended for the influx of molten material. Directing the leaking molten material away from the manifold insert 114A and away from any passageways contained within the manifold insert 114A or manifold plate 114b that are not intended for the influx of molten material also helps to direct any leakage of molten material away from auxiliary equipment and any related wiring, for example heaters, contained within the manifold insert 114A, or within any other parts of the mold assembly 102 or injection molding apparatus 100 with helps to mitigate overall damage to the mold assembly 102 or injection molding apparatus 100.

Figure 3:
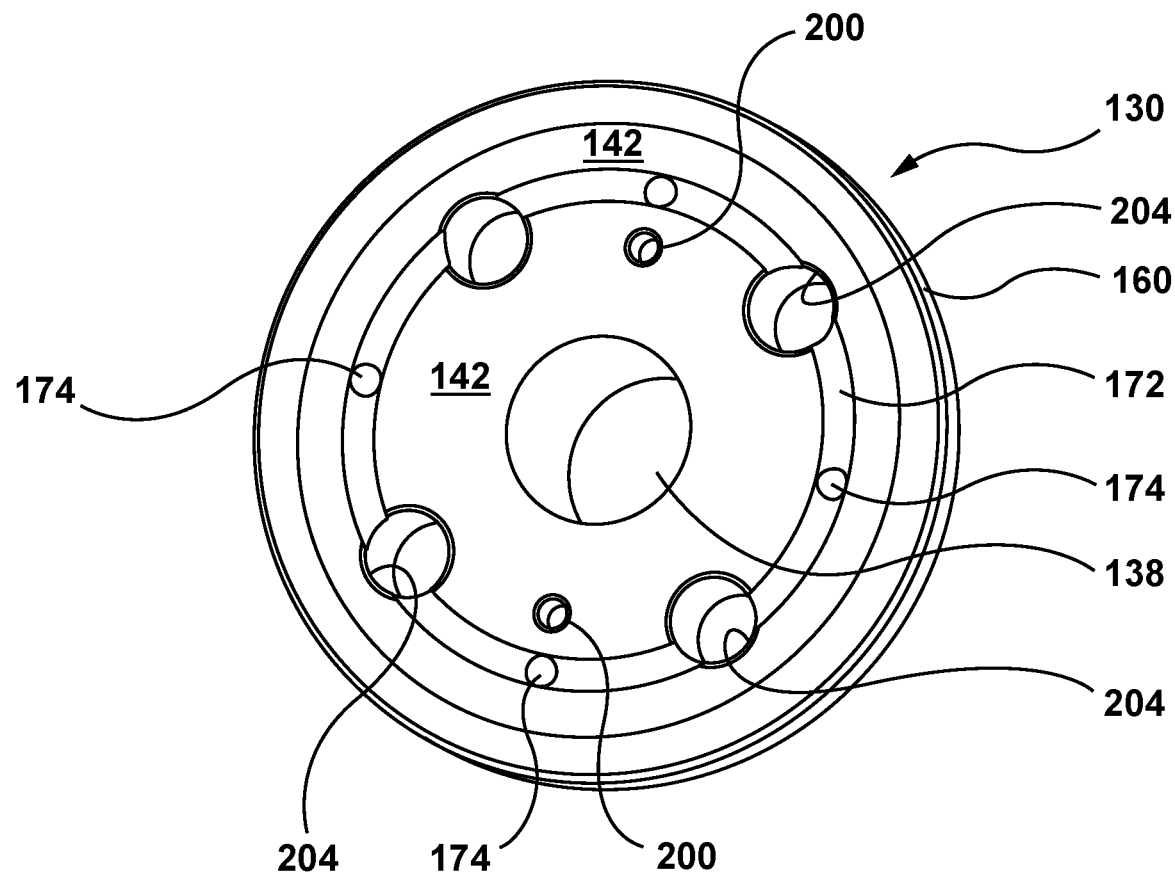
FIG. 3 is a bottom perspective view of the base of the molten material conduit device according to an example embodiment of the present disclosure.
Figure 4:
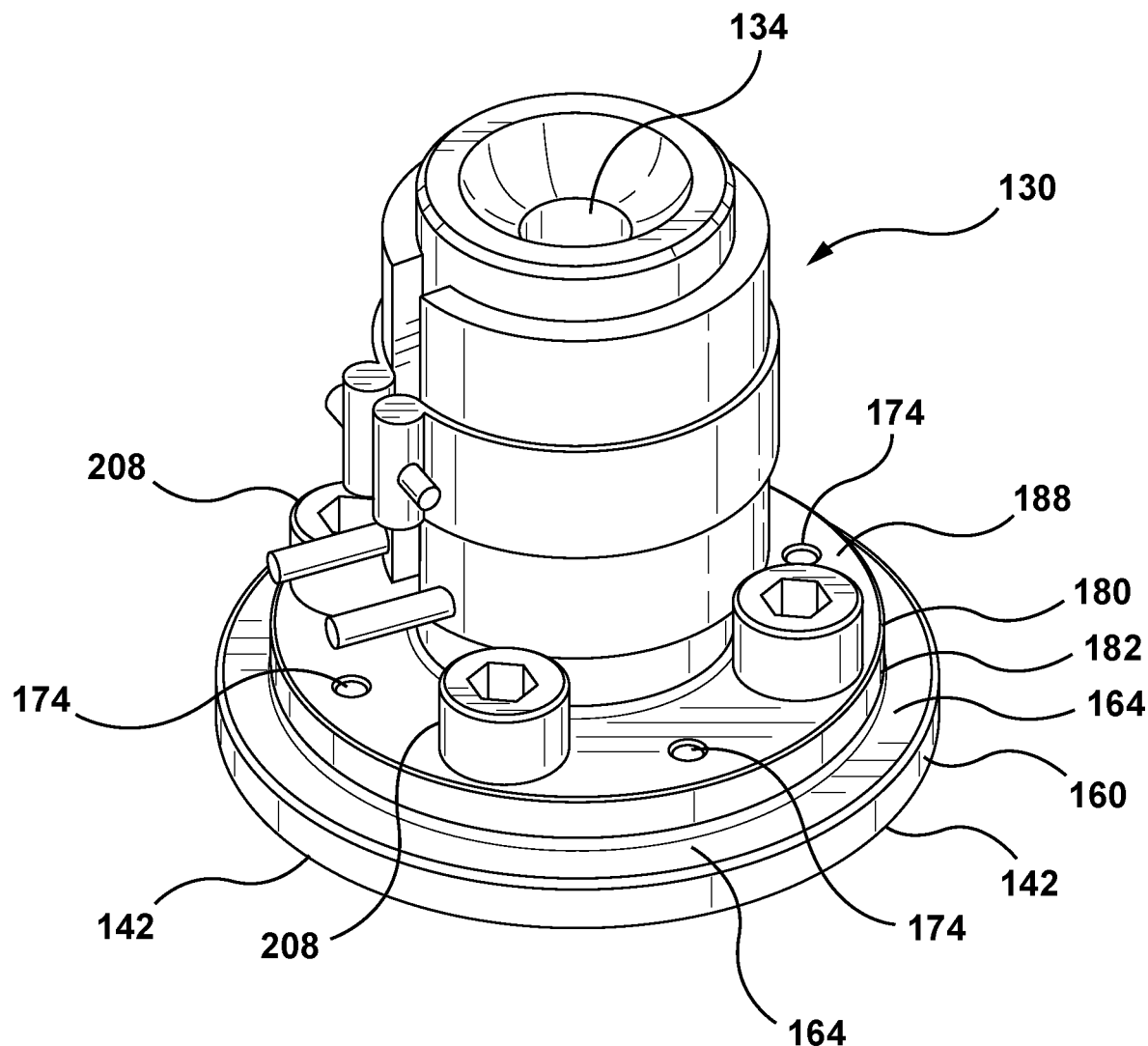
FIG. 4 is a perspective top view of the molten material conduit device.

With reference now to FIGS. 3 and 4, in some embodiments, for example, disposition of the back plate 120 on the manifold plate 114b with the molten material conduit device 130 extending through the molten material conduit device-receiving opening 150 such that the back plate engager 144 is pinched between the manifold insert 114A and the back plate 120 is also with effect that the discharge opening 138 of the molten material conduit device 130 is aligned with the molten material receiver 116. Alignment of the discharge opening 138 with the molten material receiver 116 establishes communication between the inlet opening 134 of the molten material conduit device 130 with the molten material receiver 116 such that, when a supply of molten material is delivered to the inlet opening 134, the molten material is directed to the molten material receiver 116 by way of the molten material conduit 140 and the discharge opening 138 of the molten material conduit device 130.

As shown in FIG. 3, in some embodiments, for example, the relief passage 170 includes a groove 172 disposed within the first side 161 or manifold insert sealed interface effector 142 of the base flange 160 of the molten material conduit device 130, the groove 172 extending around the discharge opening 138. The groove 172 extends into, or is recessed into, the bottom surface 161, or the manifold insert sealed interface effector 142, defined by the base flange 160 such that, when the molten material conduit device 130 is disposed in mating contact with the manifold insert 114A, there is an absence of contact between the bottom surface 161 of the discharge end 136 and the manifold insert 114A in the region defined by the groove 172.

A plurality of relief openings 174 are disposed at spaced apart intervals about the groove 172, the plurality of relief openings 174 extending through the discharge end 136 of the molten material conduit device 130 from the recessed area defined by the groove 172 to the back (or rear surface) or second side 162 of the discharge end 136. The plurality of relief openings 174 are disposed about the groove 172 such that, while the molten material conduit device 130 is mounted on the manifold insert 114A and the back plate 120 is mounted on the manifold plate 114b, each of the plurality of relief openings 174 is unobstructed by, or remains free from interference from, the molten conduit device engaging flange 152 defined by the back plate 120. Accordingly, the groove 172 and the plurality of relief openings 174 are cooperatively configured such that, while the molten material conduit device 130 is mounted on the manifold insert 114A, the groove 172 faces the manifold insert 114A such that any leakage of molten material between the manifold insert sealed interface effector 142 defined by the base flange 160 and the manifold insert 114A will enter or flow into the recessed area defined by the groove 172. Molten material entering the groove 172 will travel around the groove 172 until the molten material reaches one or more of the plurality relief openings 174 disposed in communication with the groove 172. Once the molten material reaches the one or more of the plurality relief openings 174, the molten material passes through the one or more relief openings 174 and out through the second or rear side 162 of the discharge end 136 of the molten material conduit device 130 towards the exterior of the injection molding apparatus 100. Accordingly, molten material that enters the groove 172 and that travels through the one or more of the plurality of relief openings 174 is directed away from the remaining portion of the sealed interface 142a that is effected between the manifold insert sealed interface effector 142 and the manifold insert 114A thereby maintaining at least a portion of the sealed interface 142A between the discharge end 136 and the manifold insert 114. By ensuring that at least a portion of the sealed interface 142A remains effective in the event that there is some leakage of molten material from the discharge opening 138 between the discharge end 136 of the molten material conduit device 130 and the manifold insert 114A and diverting any leakage of molten material away from critical areas of the manifold insert 114A, the potential damage due to unwanted influx of molten material into critical areas of the manifold insert is reduced.

In some embodiments, for example, the injection molding apparatus 100 includes a back plate relief passage 190 for directing any leakage of molten material to the exterior of the injection molding apparatus 100. The back plate-relief passage 190 extends within the back plate 120 and is open to the region surrounding the molten material conduit device 130 into which the plurality of relief openings 174 discharge. Accordingly, any leakage of molten material within the apparatus 100 that is diverted away from the sealed interface 142A through the groove 172 and the plurality of relief openings 174 into the region surrounding the molten material conduit device 130 will be easily identified by operators of the injection molding apparatus 100 once the molten material escapes through the back plate relief passage 190. Early identification of leakage of molten material within the injection molding apparatus 100 can serve to mitigate and/or reduce the overall damage to the manifold insert 114A and/or other critical components of the injection molding apparatus 100 caused by the leakage of molten material.

Referring in particular to FIG. 4, in some embodiments, for example, the molten material conduit device 130 further includes an aligner 180 for effecting alignment of the discharge opening 138 of the molten material conduit device 130 with the molten material receiver 116 during assembly of the injection molding apparatus 100. In some embodiments, for example, the aligner 180 is configured for cooperating with the molten material conduit device-engaging flange 152 that is defined by the back plate 120. The aligner 180 cooperates with the molten material conduit device-engaging flange 152 such that, while the molten material conduit device 130 is disposed on the manifold insert 114A and the back plate 120 is disposed on the manifold plate 114b, an edge surface 156 of the molten material conduit device-engaging flange 152 is disposed in abutting contact engagement with an edge surface 182 of the aligner 180. Disposition of the edge surface 156 of the molten material conduit device-engaging flange 152 in abutting contact with the corresponding edge surface 182 of the aligner 180 is with effect that, the central longitudinal axis 131 of the molten material conduit device 130, which extends through the molten material conduit 140 and the discharge opening 138 of the molten material conduit device 130, is disposed in axial alignment with the central axis of the molten material receiver 116. Alignment of the central longitudinal axis 131 of the molten material conduit 140 and the discharge opening 138 with the central axis of the molten material receiver 116 helps to reduce the potential for leakage of molten material within the manifold insert 114A since molten material supplied to the inlet opening 134 of the molten material conduit device 130, by the injection machine nozzle 110, is transmitted directly to the molten material receiver 116, via the discharge opening 138. Any misalignment of the discharge opening 138 of the molten material conduit device 130 with the molten material receiver 116 can result in leakage of molten material from the discharge open 138 between the manifold insert sealed interface effector 142 and the manifold insert 114A resulting in damage to the manifold insert 114A and the injection molding apparatus 100.

Figure 2:
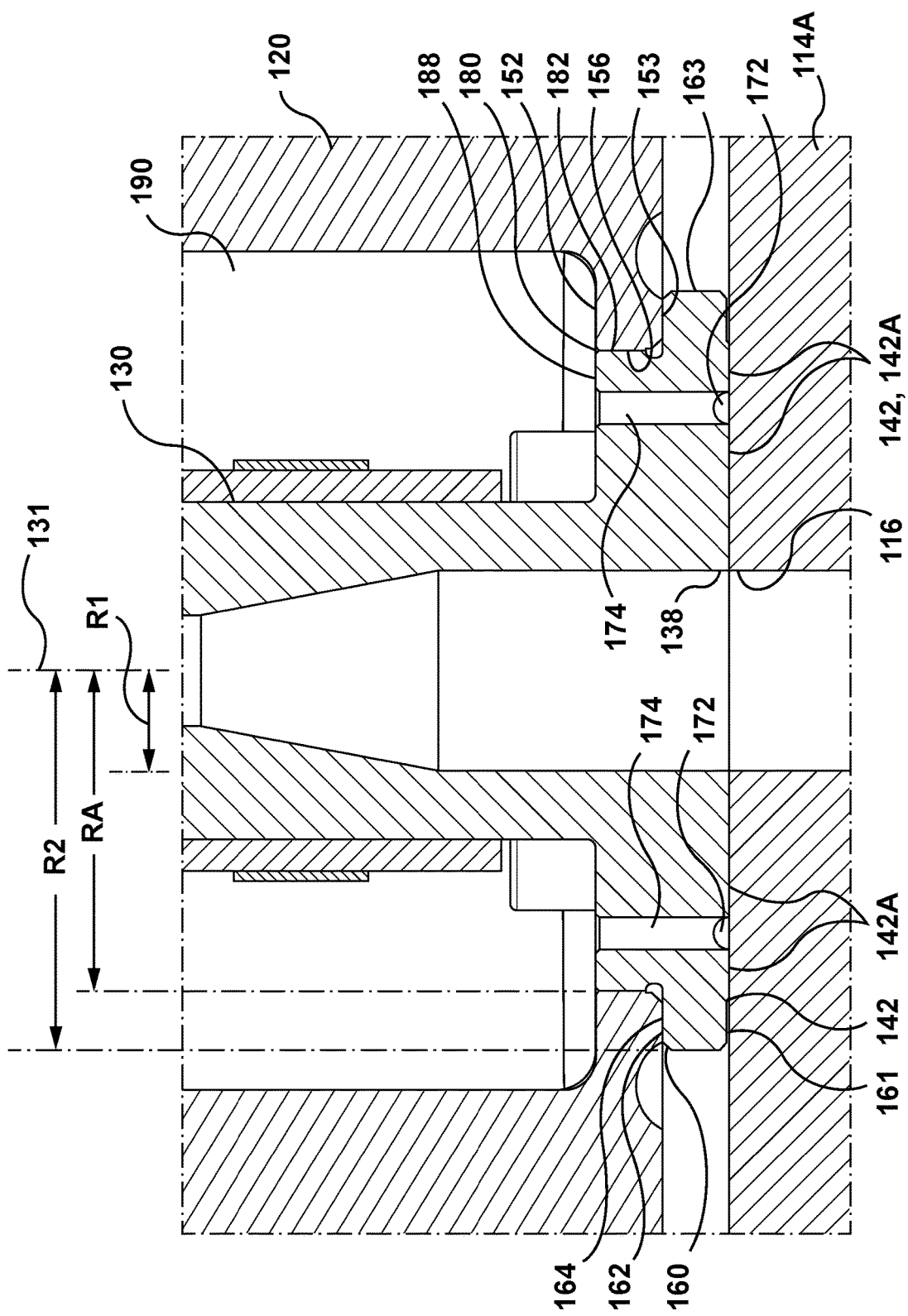
FIG. 2 is a detail cross-sectional side view of a molten material conduit device mounted within the injection molding apparatus, as shown in FIGS. 1 and 1A.

Referring, in particular, to FIGS. 2 and 4, in some embodiments, for example, the aligner 180 is in the form of a boss that projects from the base flange 160, opposite to the manifold insert sealed interface effector 142 about the molten material conduit portion of the molten material conduit device 130 and is configured to be received within the molten material conduit device-receiving opening 150 defined in the manifold plate 114b. In some embodiments, for example, the aligner 180 extends from the second side 162 of the base flange 160 such that the base flange 160 has a stepped profile. In some embodiments, the aligner 180 is circular and extends radially outwardly from the base of the molten material conduit portion of the molten material conduit device 130. Accordingly, in some embodiments, the aligner 180 has a radius, RA, as measured from the central longitudinal axis 131 of the molten material conduit device 130 to the edge surface 182 defined by the aligner 180. Accordingly, the radius, RA, of the aligner 180 is selected relative to the outer radius, R2, of the base flange 160, to ensure that at least a portion of the base flange 160 extends beyond the edge surface 182 of the aligner 180 thereby defining the back plate engager 144. The radius, R2, of the base flange 160, therefore, is greater than the radius, RA, defined by the aligner 180 such that the portion of the base flange 160 that extends beyond the aligner 180 and defines the back plate engager 144 has sufficient surface area to be sandwiched or pinched between the manifold 114 and the back plate 120 and define a sealed interface between the back plate sealed interface effector 164 and the corresponding surface of the back plate 120. In some embodiments, for example, the radius, RA, of the aligner 180 is selected such that it is between a minimum of at least 31.75 mm to a maximum of 50.8 mm. In some embodiments, for example, the molten material conduit device 130 is configured such that the ratio of the outer radius, R2, of the base flange 160 to the radius, RA, of the aligner 180 is anywhere between at least 1:1.1 and 1:1.2.

While the example embodiment illustrated in FIG. 4 shows the base flange 160 and the aligner 180 being circular, it will be understood that other configurations, such as square or hexagonal, for example, are contemplated within the scope of the present disclosure, provided that the aligner 180 is configured such that it is received within the molten material conduit device-receiving opening 150 with the edge surface 182 of the aligner 180 disposed in abutting contact with the edge surface 156 of the molten material conduit device-receiving opening 156 with effect that the discharge opening 138 is axially aligned with the molten material receiver 116. Additionally, while in the subject example embodiment, the aligner 180 forms part of the base flange 160 and is integrally formed with the molten material conduit device 130, in some embodiments, for example, the aligner 180 may be separately formed and is otherwise fixed or secured to the base flange 160 or molten material conduit device 130.

While the aligner 180 serves to align the molten material conduit device 130 relative to the manifold insert 114A and the back plate 120 such that the discharge opening 138 is aligned with the molten material receiver 116, and the inlet opening 134 of the inlet end 132 is aligned relative to the back plate 120, in some embodiments, the aligner 180 also serves to restrict possible rotation of the molten material conduit device 130 relative to the manifold insert 114A that may occur due to the forces applied to the inlet end 132 of the molten material conduit device 130 in response to repeated engagement of the injection machine nozzle 110 against the inlet end 132 of the molten material conduit device 130. In this respect, disposition of the back plate 120 on the manifold plate 114b such that the molten material conduit device-engaging flange 152 is disposed in abutting contact with the back plate-sealed interface effector 164 defined by the back plate engager 144 such that the edge surface 156 of the molten material conduit device-engaging flange 152 is disposed in abutting contact with the corresponding edge surface 182 of the aligner 130, is with effect that rotation of the molten material conduit device 130 relative to the manifold insert 114A about an axis that extends normal to the central longitudinal axis 133 of the molten material conduit 140 of the molten material conduit device 130 (or the injection axis of the injection machine nozzle 110) is resisted due to the interference between the discharge end 136 of the molten material conduit device 130 and the molten material conduit device-engaging flange 152. Specifically, in some embodiments, for example, rotation of the molten material conduit device 130 relative to the manifold insert 114A about an axis that extends normal to the central longitudinal axis 133 of the molten material conduit 140 of the molten material conduit device 130 is resisted due to the interference between the back plate engager 144 and the molten material conduit device engaging flange 152 as well as due to interference between the aligner 180 and the back plate 120, specifically, the edge surface 182 of the aligner 180 impinging against the corresponding edge surface 156 defines by the molten material conduit device engaging flange 152. Accordingly, it will be understood that the pinching of the back plate engager 144 portion of the base flange 160 of the discharge end 136 of the molten material conduit device 130 between the manifold insert 114A not only serves to align the discharge opening 138 of the molten material conduit device 130 with the molten material receiver 116 and establish a sealed interface between the discharge end 136 of the molten material conduit device 130 with the manifold insert 114A and the back plate 120, but also serves to maintain the alignment of the discharge opening 138 with the molten material receiver 116 over repeated injection cycles during continued operation of the injection molding apparatus 100.

Figure 5:
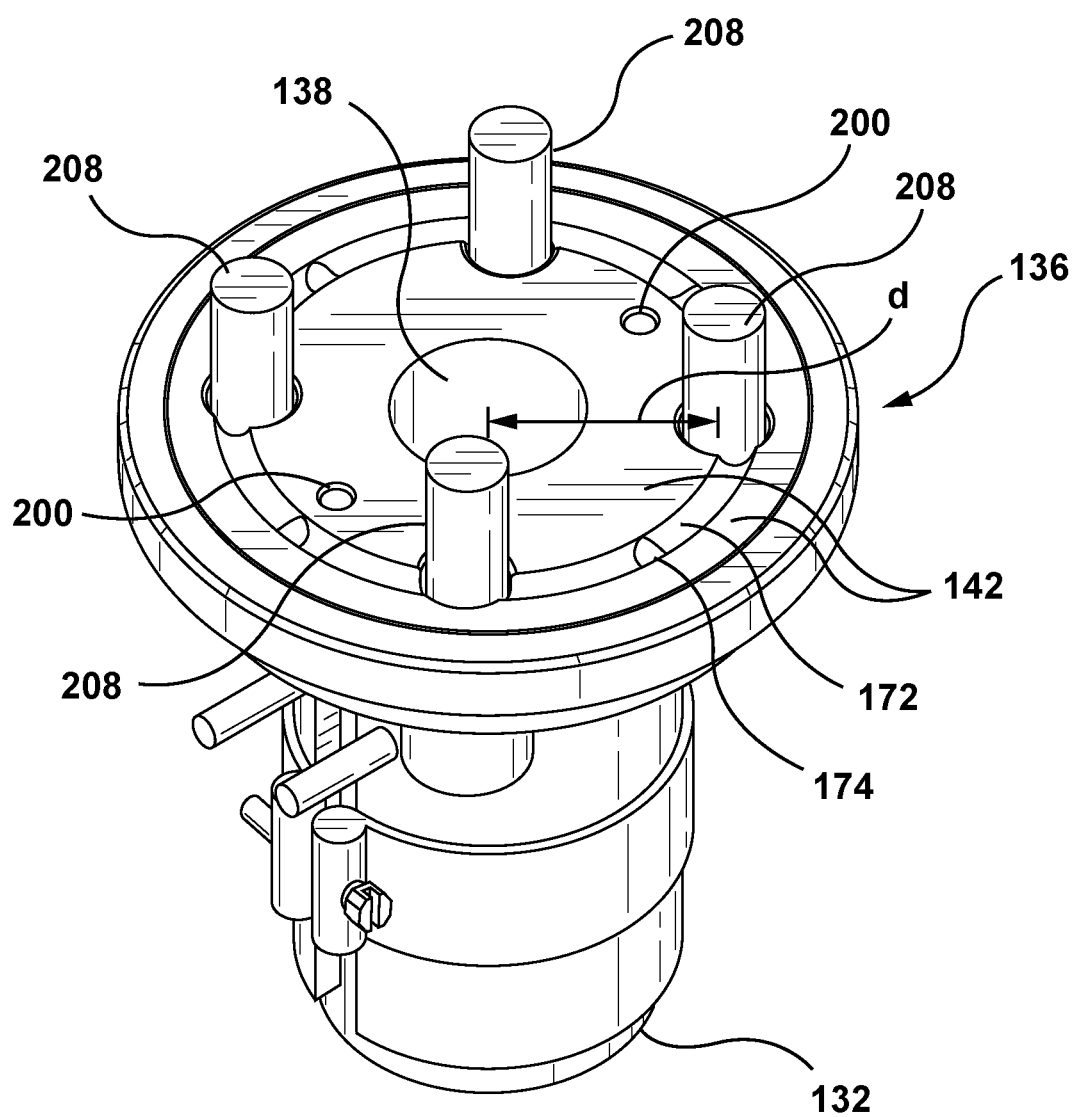
FIG. 5 is a bottom, perspective view of the molten material conduit device with mounting screws in place.
Figure 6:
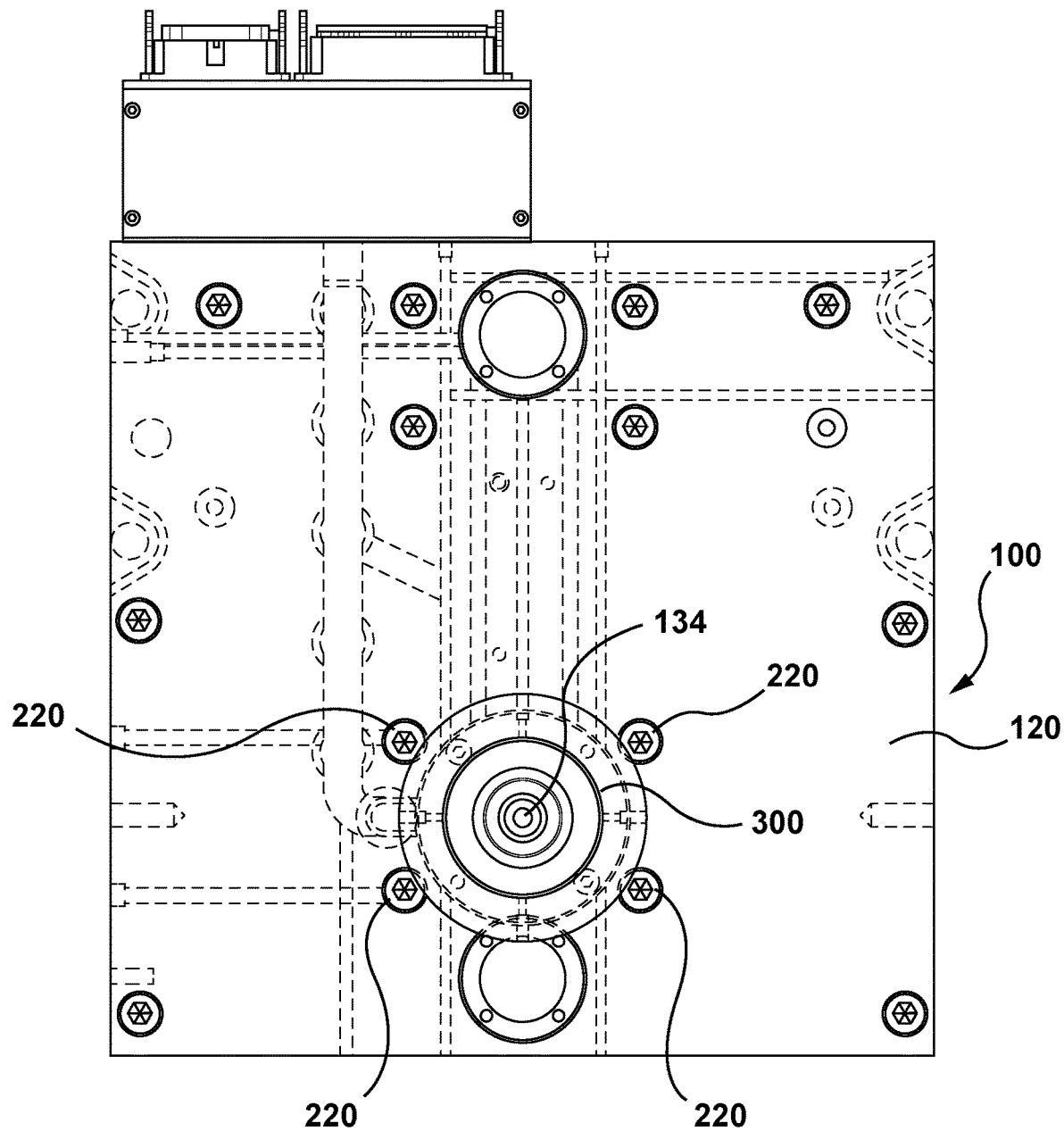
FIG. 6 is a top plan view of the injection molding apparatus of FIGS. 1-1A illustrating the injection nozzle seat provided by the molten material conduit device.

Referring in particular to FIGS. 3-5, in some embodiments, for example, in order to further secure the molten material conduit device 130 to the manifold insert 114A, fasteners 208 are used for fastening, or further securing, the molten material conduit device 130 to the manifold insert 114A. Accordingly, in some embodiments, fasteners 208 are inserted through corresponding fastener openings 204 that are formed in and extend through the discharge end 136 of the molten material conduit device 130. In the subject example embodiment, the fastener openings 204 are disposed in the discharge end 136 of the molten material conduit device 130 and extend through the aligner 180 and base flange 160 from the top surface 188 of the aligner 180 through to the bottom surface or first surface 161 of the base flange 160, as shown for instance in FIGS. 3-5. The manifold insert 114A includes corresponding fastener openings 206 that cooperate with the fasteners 208 such that when the molten material conduit device 130 is disposed on the manifold insert 114A, the fastener openings 204 on the molten material conduit device 130 align with the fastener openings 206 on the manifold insert 114A and the corresponding fasteners 208 extend through the aligned fastener openings 204, 206 securing the molten material conduit device 130 to the manifold 114. In some embodiments, for example, the fastener openings 204, 206 are threaded openings for cooperating with corresponding threaded fasteners 208. However, given that the molten material conduit device 130 is also secured in position relative to the manifold insert 114A and back plate 120 by means of the disposition of the back plate engager 144 between the manifold insert 114A and the molten material conduit device engaging flange 152, and the abutting contact between the edge surface 182 of the aligner 180 and the corresponding edge surface 156 of the molten material conduit device engaging flange 152, the amount of force exerted by the fasteners 208 to secure the molten material conduit device 130 to the manifold insert 114A is minimized. Minimizing the amount of force exerted by fasteners 208 on the discharge end 136 of the molten material conduit device 130 reduces the risk of an imbalance of forces being applied to the base flange 160 that could have an adverse effect of the establishment of the sealed interface 142A between the manifold insert sealed interface effector 142 and the manifold insert 114A. In some embodiments, for example, fasteners 208 are not required where the clamping effect of the back plate 120 against the discharged end 136 of the molten material conduit device 130 is sufficient to ensure stability of the molten material conduit device 130 relative to the manifold insert 114A.

Referring again to FIG. 1A, in some embodiments, for example, in order to secure the back plate 120 to the manifold plate 114b, back plate fasteners 220 are used that are configured to extend through corresponding fastener-receiving openings 224, 226 disposed in the back plate 120 and in the manifold plate 114b. The securing of the back plate 120 to the manifold plate 114b via the back plate fasteners 220 fixes the back plate 120 to the manifold plate 114b effectively clamping the back plate 120 to the manifold plate 114b. The clamping together of the back plate 120 and the manifold plate 114b, by way of the back plate fasteners 220, is with effect that some of the clamping effect is transmitted to the molten material conduit device 130 via the molten material conduit device-engaging flange 152 for securing and stabilizing the molten material conduit device 130 in position relative to the manifold insert 114A and within the injection molding apparatus 100. In some embodiments, the back plate fasteners 220 and the corresponding openings 224, 226 are spaced apart from the central longitudinal axis 131 of the molten material conduit device 130 by a radial distance, D, that is about five times greater than the radial distance, d, by which the molten material conduit device fasteners 208 are spaced relative to the central longitudinal axis 131 of the central longitudinal axis 131. By having the back plate fasteners 220 spaced apart from the location of the molten material conduit device 130, the potential for back plate fasteners 220 to induce stress on the discharge end 136 or base flange 160 of the molten material conduit device 130, as torque is applied to the back plate fasteners 220 as they advance through the corresponding sets of receiving openings 224, 226 during installation, is reduced. Stress that may be induced on the base flange 160 as a result of the fasteners 220 being secured within the corresponding openings 224, 226 can result in an imbalance of forces applied to the discharge end 136 or base flange 160 of the molten material conduit device 130 that can lead to misalignment of the discharge opening 138 with the molten material receiver 116. As the securing of the molten material conduit device 130 relative to the manifold insert 114A is primarily effected by the clamping or "pinching" of the back plate engager 144 between the molten material conduit device-engaging flange 152 and does not rely on fasteners 220 being installed within close proximity to the molten material conduit device 130, the fasteners 220 can be installed at a greater distance away from the location of the molten material conduit device 130 which facilitates assembly of the injection molding apparatus 100 since the potential for the creation of imbalanced forces on the molten material conduit device 130, as torque is applied to the fasteners 220, is reduced as a result of the positioning of the fasteners 220 relative to the molten material conduit device 130 within the injection molding apparatus 100. For example, in a specific example embodiment wherein the radial distance, D, by which the back plate fasteners 220 are radially spaced apart from the central longitudinal axis 131 of the molten material conduit device 130 is 117 mm while the radial distance, d, between the central longitudinal axis 131 of the molten material conduit device 130 and the molten material conduit device fasteners 208 is 22.98 mm, the force imparted by each of the back plate fasteners 220 is about 40700 lb while the force imparted by each of the molten material conduit device fasteners 208 is about 9960 lb. By having the larger forces imparted by the back plate fasteners 220 spaced apart from the molten material conduit device 130, it has been found that the potential for imbalances at the molten material conduit device 130, that can give rise to leakage from the molten material conduit device 130 is reduced. Assembly of the apparatus 100 is also facilitated given that the higher forces are being applied at a greater distance away from the molten material conduit device 130.

While various embodiments of the injection molding apparatus 100 have been described, it will be understood that certain adaptations and modifications of the described embodiments can be made. Therefore, the above discussed embodiments are considered to be illustrative and not restrictive.

What is claimed is:

1. An injection molding apparatus for receiving molten material from an injection machine nozzle of an injection molding machine, and delivering the molten material to at least one mold cavity housed within a cavity side of a mold assembly, comprising:
    a manifold comprising:
        a manifold plate; and
        a manifold insert disposed within the manifold plate, the manifold insert including:
            a molten material receiver configured for receiving molten material; and
            at least one passageway for transmitting the molten material received at the molten material receiver to the at least one mold cavity;
    a molten material conduit device having an inlet opening for receiving the molten material from the injection machine nozzle, a discharge opening for transmitting the molten material to the molten material receiver, and a molten material conduit extending therebetween; and
    a back plate disposed on the manifold plate and configured for cooperating with the injection machine nozzle;
    wherein:
        the molten material conduit device includes a base flange defined at a discharge end of the molten material conduit device, the base flange extending outwardly away from the discharge opening, the base flange having a first side defining a manifold insert sealed interface effector that extends around the discharge opening, and a second side defining a back plate sealed interface effector; and
        the manifold plate, the manifold insert, the molten material conduit device and the back plate are cooperatively configured such that:
            at least a portion of the base flange is disposed between the manifold insert and the back plate such that the first side is disposed in abutting contact with a portion of the manifold insert and the second side is disposed in abutting contact with a portion of the back plate;
            the discharge opening is disposed in alignment with the molten material-receiver such that communication between the inlet opening of the molten material conduit device and the molten material receiver of the manifold insert is established; and
            disposition of the at least a portion of the base flange between the manifold insert and the back plate is with effect that:
                (i) a first sealed interface is established between the manifold insert sealed interface effector and the manifold insert; and
                (ii) a second sealed interface is established between the back plate sealed interface effector and the back plate.

2. The injection molding apparatus as claimed in claim 1;
wherein:
    the manifold plate, the manifold insert, the molten material conduit device and the back plate are cooperatively configured such that:
        rotation of the molten material conduit device about an axis that is normal to a central longitudinal axis of the molten material conduit device is resisted in response to interference between the base flange and the back plate.

3. The injection molding apparatus as claimed in claim 1; wherein:
the manifold plate includes a manifold insert receiving opening configured for receiving the manifold insert; and
disposition of the manifold insert within the manifold plate is such that:
while the injection molding apparatus is disposed for receiving molten material, the manifold plate and the manifold insert are co-operatively configured such that the manifold insert is disposed for delivering the molten material received at the molten material receiver to the at least one mold cavity.

4. The injection molding apparatus as claimed in claim 1; wherein:
the back plate includes a manifold insert engaging side and an injection machine nozzle engaging side; and
disposition of the back plate on the manifold plate is with effect that the manifold insert engaging side is disposed in abutting contact with the manifold plate and the manifold insert.

5. The injection molding apparatus as claimed in claim 1; wherein:
the molten material conduit device includes:
a relief passage extending through the base flange from the first side to the second side, the relief passage having an inlet disposed in the manifold insert sealed interface effector and an outlet disposed on the second side of the base flange;
disposition of the back plate on the manifold plate is such that the outlet of the relief passage is unobstructed by the back plate; and
while the molten material conduit device is disposed on the manifold insert and the back plate is disposed on the manifold such that the first sealed interface and the second sealed interface are established; and
while the injection molding machine is disposed in a closed position wherein the injection molding apparatus is in communication with the at least one mold cavity and molten material is delivered to the molten material-receiver from the injection machine nozzle, via the molten material conduit device:
defeating of the first sealed interface such that molten material travels between the base flange and the manifold insert is with effect that the molten material is directed away from the manifold insert via the relief passage.

6. The injection molding apparatus as claimed in claim 1; further comprising:
a plurality of molten material conduit device engagers having a first end for engaging the first side of the base flange and a second end for engaging the manifold insert;
wherein:
the base flange includes a plurality of engager-receivers, wherein each engager-receiver is configured for receiving the first end of a corresponding one of the plurality of molten material conduit device engagers; and
the manifold insert includes a plurality of engager-receivers, wherein each engager-receiver is configured for receiving the second end of the conduit device engager; and
the molten material conduit device, the manifold insert and the molten material conduit device engagers are cooperatively configured such that:
disposition of the molten material conduit device on the manifold insert is with effect that:
the first end of each of the molten material conduit device engagers is received within the corresponding engager-receiver disposed in the base flange;
the second end of each of the molten material conduit device engagers is received within the corresponding engager-receiver disposed in manifold insert;
the discharge opening is axially aligned with the molten material receiver; and
displacement of the molten material conduit device relative to the manifold insert is resisted.

7. The injection molding apparatus as claimed in claim 1; further comprising:
a plurality of molten material conduit device fasteners; wherein:
the molten material conduit device includes a plurality of fastener receiving openings disposed within the base flange at spaced apart intervals about the discharge opening;
the manifold insert includes a plurality of receiving openings disposed at spaced apart intervals about the molten material receiver;
disposition of the molten material conduit device on the manifold insert is such that the molten material conduit device fastener receiving openings are disposed in alignment with the fastener receiving openings disposed in the manifold insert; and
engagement of a respective one of the plurality of molten material conduit device fasteners within a corresponding set of aligned molten material conduit device fastener receiving opening and manifold insert fastener receiving openings is with effect that the molten material conduit device is secured to the manifold insert such that displacement of the molten material conduit device relative to the manifold insert is resisted.

8. The injection molding apparatus as claimed in claim 1; further comprising:
a locating ring mounted to the back plate, the locating ring having an opening for receiving the inlet end of the molten material conduit device; and
the manifold, the molten material conduit device, the back plate and the locating ring are cooperatively configured such that:
the inlet end is disposed within the opening defined by the locating ring; and
disposition of the inlet end within the opening defined by the locating ring is with effect that:
the inlet opening is located relative to the back plate and configured for engaging the injection machine nozzle;
displacement of the molten material conduit device relative to the back plate is resisted in response to interference between the inlet end of the molten material conduit device and the locating ring; and
a sealed interface is established between the inlet end of the molten material conduit device and the locating ring.

9. The injection molding apparatus as claimed in claim 4; wherein:
the back plate includes a molten material conduit device engaging flange defining a molten material conduit device receiving opening;
disposition of the back plate on the manifold plate is with effect that:
the molten material conduit device extends through the molten material conduit device receiving opening; and
the molten material conduit device engaging flange is disposed in abutting contact with the back plate sealed interface effector.

10. The injection molding apparatus as claimed in claim 9; wherein:
the molten material conduit device includes:
an aligner; and
disposition of the back plate on the manifold plate such that the molten material conduit device extends through the molten material conduit device receiving opening and the molten material conduit device engaging flange is disposed in abutting contact with the back plate sealed interface effector, is with effect that the aligner is disposed in contact engagement with the molten material conduit device engaging flange.

11. The injection molding apparatus as claimed in claim 10; wherein:
disposition of the aligner in contact engagement with the molten material conduit device engaging flange is such that an edge surface of the aligner is disposed in abutting contact with an edge surface of the molten material conduit device engaging flange with effect that:
the discharge opening is disposed in axial alignment with the molten material receiver.

12. The injection molding apparatus as claimed in claim 10; wherein:
the aligner includes a boss extending from the second side of the base flange, such that the base flange has a stepped profile.

13. The injection molding apparatus as claimed in claim 5; wherein:
the relief passage includes:
a groove disposed within the first side of the base flange and around the discharge opening, the manifold insert sealed interface effector extending on either side of the groove; and
a plurality of relief openings disposed at spaced apart intervals about the groove and extending through the base flange, each relief opening having a first open end in communication with the groove and a second open end disposed in the second side of the base flange.

14. The injection molding apparatus as claimed in claim 7; wherein:
the engagement of the plurality of molten material conduit device fasteners within the corresponding sets of aligned molten material conduit device fastener receiving opening and manifold insert fastener receiving openings is with effect that a force is applied to the base flange of the molten material conduit device via each of the plurality of molten material conduit device fasteners.

* * * * *